Dec. 3, 1957 W. HAUER 2,815,183
DISPATCH-TUBE SYSTEM
Filed March 27, 1956 8 Sheets-Sheet 1

Fig. 1

INVENTOR
W. HAUER
BY
ATTORNEY

Fig. 3

Dec. 3, 1957 W. HAUER 2,815,183
DISPATCH-TUBE SYSTEM
Filed March 27, 1956 8 Sheets-Sheet 4

Fig. 4

INVENTOR
W. HAUER
BY
ATTORNEY

Dec. 3, 1957  W. HAUER  2,815,183
DISPATCH-TUBE SYSTEM
Filed March 27, 1956  8 Sheets-Sheet 7

Fig. 7

INVENTOR
W. HAUER
BY
ATTORNEY

Dec. 3, 1957 W. HAUER 2,815,183
DISPATCH-TUBE SYSTEM
Filed March 27, 1956 8 Sheets-Sheet 8

Fig. 8

INVENTOR
W. HAUER
BY
ATTORNEY

United States Patent Office 2,815,183
Patented Dec. 3, 1957

2,815,183

DISPATCH-TUBE SYSTEM

Werner Hauer, Berlin-Lichterfelde, Germany, assignor to International Standard Electric Corporation, New York, N. Y., a corporation of Delaware Application March 27, 1956, Serial No. 574,154

Claims priority, application Germany March 31, 1955

10 Claims. (Cl. 243—16)

The invention relates to dispatch-tube plants in which the destination of the containers or so-called carriers for the articles to be sent is predetermined at the senders by means of electrical criteria transferred to routing switches or to other devices serving to determine the direction and conveyance of the carriers. Such a criterion, produced through the operation of keys or of dials, is impressed on electric storers, also spoken of as registers. The tube line from the respective sender to the desired receiver is subdivided in sections. This provision is to render it possible for a plurality of carriers to be in the tubes all at the same time. Each such section never contains more than one carrier, so the efficiency of the plant will be increased by the sections of the transmission path becoming made small as far as feasible. The destination mark is impressed, by the sender, on electric registers. Through these, the registers following in the direction of travel of the carriers are affected from section to section and will thus have in succession the destination mark or criterion transferred to them. The release of the registers so affected is accomplished by contacts of the tube which are under the control of the carriers.

Extensive dispatch tube systems comprise a plurality of sending stations and the same or approximately the same number of receiving stations. These sending stations are joined to a tube line, the receiving stations being joined to another tube line, but it may be necessary to provide more than one tube line for the sending stations as well as for the receiving stations. In this case means must be arranged to connect any one of the sending lines with any one of the receiving lines. Appropriately, this means is a central routing switch. Systems of such a large type may also comprise routing switches between the sending stations and the sending line common to them, and routing switches leading from the receiving lines to the individual receivers. The branch lines so provided may in their turn be fitted with routing switches.

The plant basic of the invention is concerned with controlling all the routing switches in such a large dispatch tube system, in particular the central routing switch, and is also concerned with any arrangements serving to transfer the destination criteria from any sender to the control devices between it and the intended receiver.

The invention has for its object still further to raise the efficiency of such plants. Its main feature is that each tube line has registers allocated to it in groups and that each of these registers acts to transfer the stored destination criterion to the next following register as soon as this has in its turn transferred its contents to the register following upon it, the former register thus being free to again take up destination criteria. Such transfer actions are accomplished directly, that is, without the aid of contacts under control of the carriers. Accordingly, the method here employed to have the destination criteria transferred from one register to the other merely depends on the speed with which they are taken up by the registers and passed on by these to the respective next following register. The time taken by a carrier traveling along a tube section checked by the register is independent of this speed. Therefore, as many carriers can travel simultaneously along a tube section as there are registers provided for it. However, care should be taken that the carriers within such a section, in order not to interfere with each other, be always spaced at sufficient distances apart.

To insure that at the end of the transmission path, or of a part thereof, the destination criteria may operate the receiver, which may be an arrangement serving to convey the carriers still farther and may also be a routing switch, another feature of the invention provides that a supervisory or pilot device be arranged, which besides may have senders or groups thereof joined to it.

This pilot device has to perform several functions. First of all, with the carrier traveling along the supervised section, the pilot device is required to take the destination criterion from the preceding register and to transfer it to the register of the receiver, or to the plant intended to continue the conveyance of the carriers, as the case may be. Moreover, the pilot device ascertains how many carriers have entered the supervised section and how many carriers have left it, and in the event of disturbances in their motion initiates a control action.

The pilot device, that may be arranged to govern not only one but several tube sections, also is required to block those sections along which carriers from remote sections are traveling, the sections so blocked being thereby prevented from receiving carriers that arrive from the sections supervised. Furthermore, this pilot device, when the carrier therein is leaving it, acts to transfer the destination criterion of that carrier to the next following register and does not cease from affecting the control arrangement for the sending-line until the first register shall have delivered that destination criterion to the next following register. The carrier-piloting device is controlled by the carrier through contacts provided before and behind the sections supervised by this device. Of these contacts, the input contact controls the blocking means arranged to govern the admission of carriers arriving from the supervised section, whereas the contact at the output initiates the transfer of the destination criterion and causes the release of these tube sections.

The pilot device comprises an input counter and an output counter which are controlled by the pulses from the said input and output contacts, respectively. Through these, a circuit is closed to excite a relay which then establishes the connection from the sending-line register to the control device of the first section. With a carrier traveling along this section, that circuit will be interrupted in consequence of the positions of the counters differing from each other. The connection from the sending-line register is thereby changed over to the section register. In the event of trouble preventing carriers from leaving a tube section, or in the case of lateness of the carriers, or with contact-trouble or other such incidents, a circuit arrangement will be operated to cause all the carriers in the sending line to leave it and also to initiate cancellation of all the destination criteria.

Another feature of the invention lies in the construction of the routing switches. In this respect, prior plants have devices that cause the incoming destination tubes to be tested or scanned in succession in order to release the carriers collected at the outlets of these tubes and to deliver them, one after another, to the desired outgoing tubes.

In dispatch-tube plants of high traffic load this scanning system has the drawback that the conveyance of a carrier from an incoming tube to an outgoing one involves a loss of much time, because the scanning device must test each of the incoming tubes no matter whether or not carriers are waiting in them, and must besides, if the desired outgoing tubes are off-set with respect to the respective incoming tubes, perform undesirable test and switch actions.

The invention avoids these shortcomings and increases the traffic capacity in such a manner that means are arranged to release the carriers from holding devices or arresters of the tube incoming to a central routing switch, such release depending upon whether or not the tubes outgoing from the central routing switch are free to receive other carriers, and further, that means are arranged to operate this switch in a manner depending on the number of carriers retained in the incoming tubes by the said arresters. The central routing switch is thus under the control of the outgoing tubes. The said arresters have contacts which are not switched until a definite number of carriers have collected in the incoming tubes. Through the contacts so switched a so-called preference circuit for the respective incoming tube is closed, that remains closed until so many carriers have left this tube that the appertaining one of said contacts can return to normal, the tube being no longer overloaded.

Another special feature of the invention lies in the construction of the receiving lines. Since the speed of the carriers is not always the same because, for example, their well known felt ring is subject to wearing away, or because the carriers are loaded differently from each other, each carrier can happen to be caught up or joined by a carrier traveling faster than the former. The operation of the plant would thus be disturbed.

Therefore, in prior arrangements the waiting carriers, being ready for dispatch, are started with a time delay sufficient to insure that up to the last routing switch or to the last receiver no carrier shall be reached by any one traveling faster than it. This time delay, by which long transmission paths shall be held clear, determines the efficiency of the plant.

Accordingly, the invention also concerns an arrangement that permits of increasing the efficiency of such systems. The main feature here is that the tube line equipped with the receiving stations is divided into zones which correspond to the distances from the sender and each of which has control and storage devices for the destination criteria, these devices acting to clear the transmission path as soon as a carrier in it can not possibly be reached by one following upon it.

In this way it is possible for the plant to be utilized up to the utmost limit, without trouble having to be feared.

The invention will be more fully understood from the following description, reference being had to the drawings in which.

Figure 1:
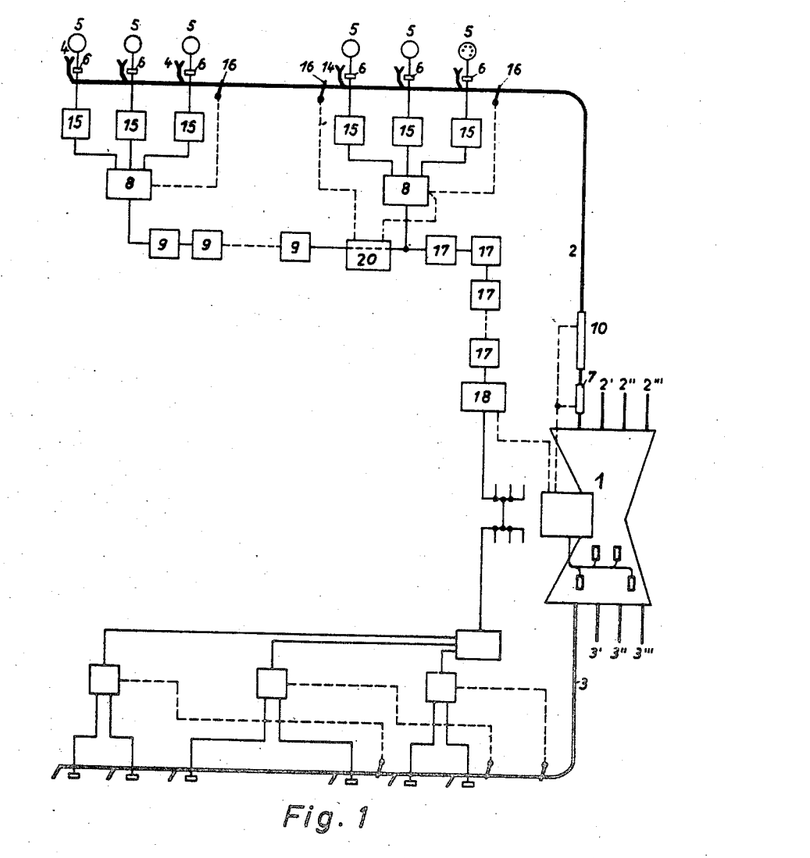
Fig. 1 is a diagrammatic representation of a dispatch tube system as provided by the invention.

The arrangement according to Fig. 1 has a central routing switch 1 arranged to connect incoming tube lines 2, 2', 2", 2'" with outgoing lines 3, 3', 3", 3'". Only the lines 2, 3 are represented completely. Line 2 has senders 4 and 14 that belong to different sections. When a carrier is put into a sender 4 or 14, the destination criteria are transferred by dials 5 or other suitable switch means over sender registers 15 and sending-line control facilities 8 to the sending-section registers 9. The supervisory or pilot device 20 is included in the section pertaining to the senders 14 and is interposed between the registers 9 and the sending-line registers 17 followed by a sending-line end-register 18. The pilot device 20 is under the control of contacts 16 located before and behind the section of the senders 14. Whenever a carrier from the section pertaining to the senders 14 is now in the section belonging to the senders 14, arresters 6 for the carriers prevent a carrier, inserted in any one of the senders 14, from entering the tube line 2. Trouble in this section initiates a switch action such that the carriers in this section shall be delivered to a predetermined receiver and that the destination criteria stored in the registers 17, 18 shall be cancelled. After all the carriers have thus left the disturbed section, the plant can be reoperated.

It will thus be seen that the senders 4 and 14, equipped with the dials 5, also comprise the carrier arresters 6. Arranged before the routing switch 1 is a carrier arrester 7 of tube 2. The tubes 2', 2", 2'" are each likewise fitted with such an arrester, not shown. The arresters 6, 7 are to retain the carriers until tube 2 or switch 1, respectively, are free to take them up. Instead of the dials 5, keying arrangements may be employed.

The seizure circuits of the various sender circuits are combined into a row and are associated with a time grouping circuit arranged to regulate the order of succession in which the busy senders will be released. By such time-grouping all those senders of a line which during the release of one or more senders cause a seizure, are combined into a group and are then released in the order of succession in which they have been charged. Seizures brought about during that time will not be dealt with but will be combined into a new group after the former group has been attended, and will then be dealt with in the same manner as before.

The sending line is subdivided in sections of which each comprises senders 4 or senders 14. Interposed between these sections are the registers 9 by which the destination criterion is stored when the respective carrier is traveling toward the next following section, and which finally transfer the destination criterion over the sending-line registers 17 to the sending-line end-register 18. This register then operates the central routing switch 1 in dependence on the tubes 3 being free, and in dependence on contact 10 of the carrier arrester 7.

The tubes 3 are likewise subdivided in sections, but the control means of these sections receive the destination criterion direct from the central control-arrangement and then operate the routing switch of the respective receiver or receivers 20.

Figure 2:
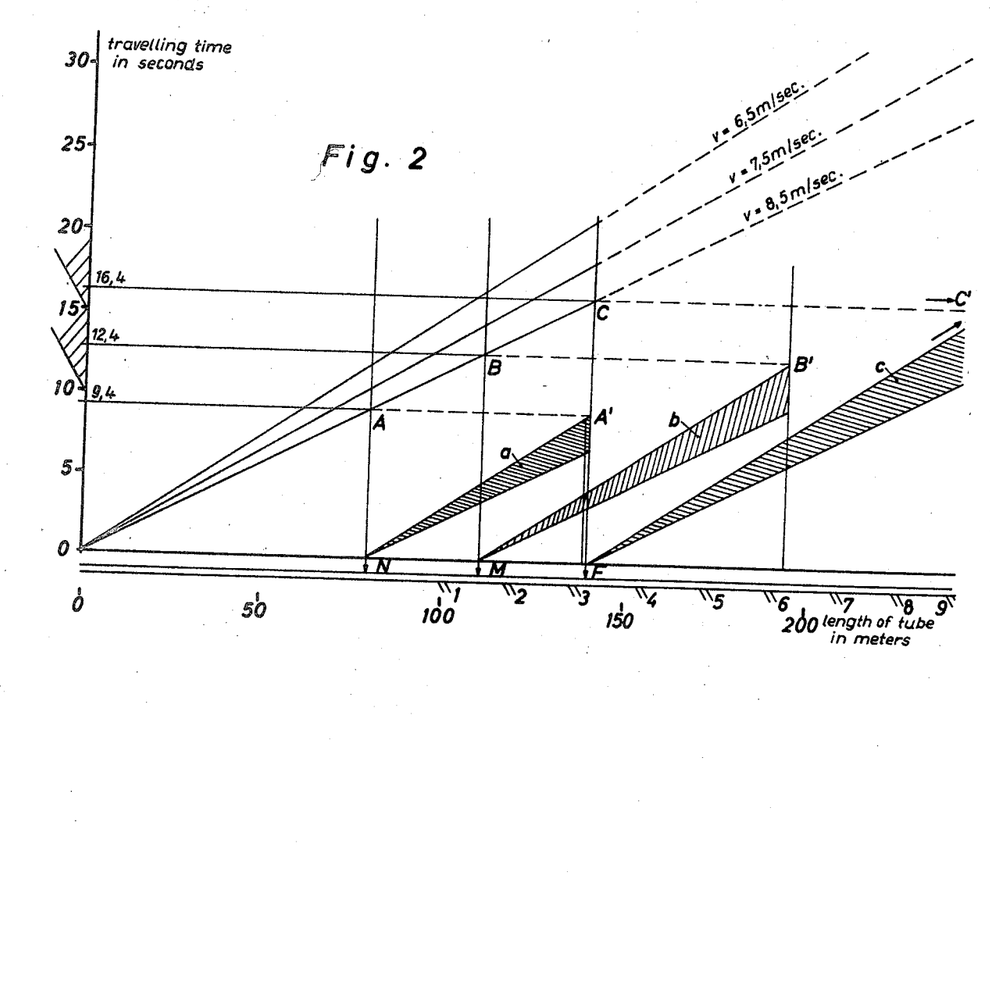
Fig. 2 is a coordinate graph illustrating the velocities and the motion of the carriers in the receiving lines, Figs. 3–8 placed from left to right in numerical order constitute a composite circuit and layout diagram illustrating the entire plant.

In Fig. 2, the abscissa line has the tube lengths indicated on it in meters. On the ordinate the traveling periods are indicated in seconds. The three lines from the zero point O are the spot-and-time curves of carriers whose speeds are 8.5 meters, 7.5 meters, and 6.5 meters per second.

The entire tube line, that has receivers 1–9 fitted to it, is divided into three zones. The first zone extends from about 80 to 140 meters, the second from 140 to 195 meters, the third from 195 to 250 meters. Each of these zones contains three of the receivers 1–9. In order that the plant may operate with safety, the slowest carrier, its speed being 6.5 m./sec., must be taken into account. Within the limits of each zone the stray lines of the carrier speeds are represented as areas $a, b, c$. The origins of the stray lines are designated N, M, F. The carrier of the highest speed, here assumed to be 8.5 m./sec., enters the first zone through passing by point A. This zone begins at N, that is, at 80 meters from the sending station at O, and after a period of about 9.4 seconds. When passing by B, the carrier then having traveled 110 meters, and after about 12.4 seconds, the carrier reaches the mid-zone, this beginning at M. Finally, when at C, after a travel of 140 meters and about 16.4 seconds, this carrier enters the remote zone, which begins at F. In the worst case, that is, if the carrier speeds are lowest, carriers traveling simultaneously past the zone origins N, M, F will have reached the points A', B', C' and will thus have arrived at least at the ends of the respective zones, or will already have reached their destinations when the carrier from the sending station arrives in its turn at N, M, F. Within the area of the drawing the lines from the zero point O do not meet the lines from the points, N, M, F, that is to say, a carrier starting from the sending station will in any case not be able to reach the carrier preceding it. Such preceding carrier, when reaching the spots N, M, F acts, in accordance with the zone of its destination, to clear the tube line in order that the next following carrier may be able to travel along this line. Thus, a number of carriers may be in the tube line without disturbing each other.

The distances between the carriers need not agree with those here stated. For instance, they may be much smaller than these. By receiving stations or receivers are meant not only ejecting devices but routing switches leading into a by-path tube which may in its turn have several receivers joined to it.

In the example here described, the clearing of the receiving lines is accomplished at the spots N, M, or F in such a way that already during the electrical storing of the destination criterion the respective zone, allocated to the destination, acts to switch the contact of this zone to prepare that clearing. For instance, if a carrier is intended for the first zone, which extends from 80 to 140 meters, the clearing of this tube length is initiated by a carrier in the tube with the aid of a contact provided at N. If, however, the carrier is for a destination in the remote zone, then, in order to permit of sending the carrier, the preceding carrier must have passed by the spot F and the contact at this spot must have been switched, in case this carrier be likewise intended for the remote zone. In the other case the clearing already accomplished by the contact at N if the preceding carrier is for the first zone, whereas the clearing will be effected by the contact at M whenever the carrier is for the mid-zone. Similar relationship apply for the release of a waiting carrier whose destination is in the mid-zone. In this event the release by the contact at N is accomplished only if a carrier for the first zone arrives to switch it, whereas the carriers intended for the mid-zone as well as those for the remote zone must have switched the contact at M.

Where the entire tube line is divided in more than three zones, the control system has to be accommodated to such other subdivision.

The operation of this dispatch tube system will now be more fully explained with the help of Figs. 3–8. Contacts denoted by small reference letters form part of relays denoted by the corresponding capital letters.

Figure 3:
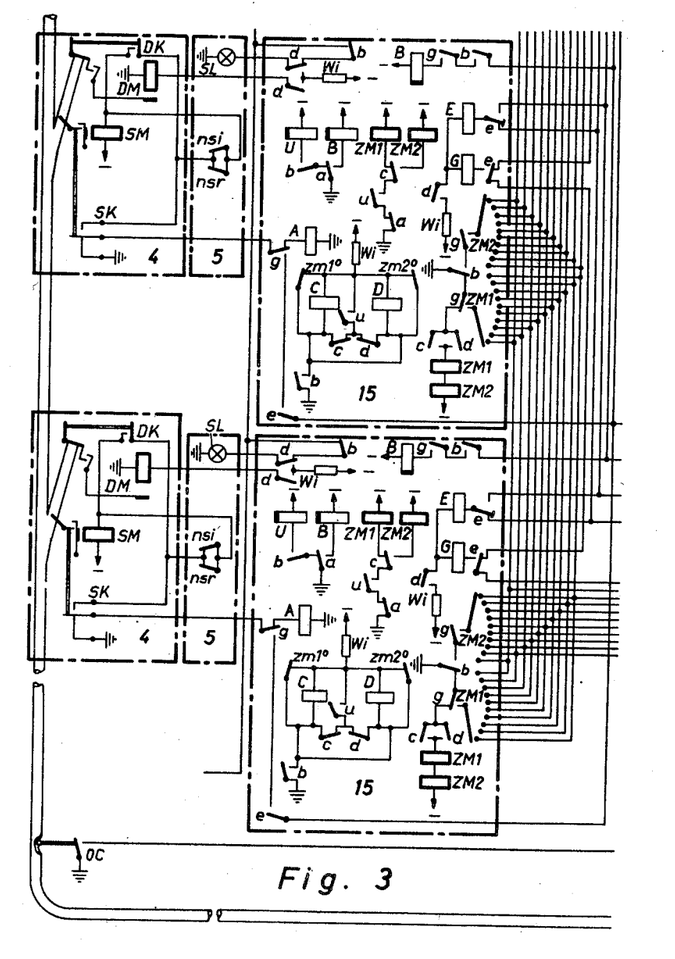

Each sender 4, Fig. 3, comprises a tube or socket that leads into the sending line 2. A carrier inserted into such a socket switches the contact SK. Thereby the following circuit is closed in the arrangement shown in Fig. 3:

Minus, magnet coil SM, parallel connection of the contacts $nsi$, $nsr$ of the dialing equipment 5, contact $g$ in the sender register 15, relay A, ground, the plus-pole of the operating voltage source being grounded. Contact $a$ of relay A is hence switched over to energize relay B. Consequently the signal lamp SL connected by contact $b$ of relay B to a voltage source furnishing an interrupted voltage, so lamp SL will be flashing.

Now the destination criterion is dialed by means of equipment 5. The first pulse produced by this dialing acts to excite the relay U, the contact $b$ in the circuit of this relay having been closed by relay B energizing. Contact $u$ in the circuit of relay ZM1 is hence operated by the dialing pulses, these being thus transferred to ZM1.

Figure 4:
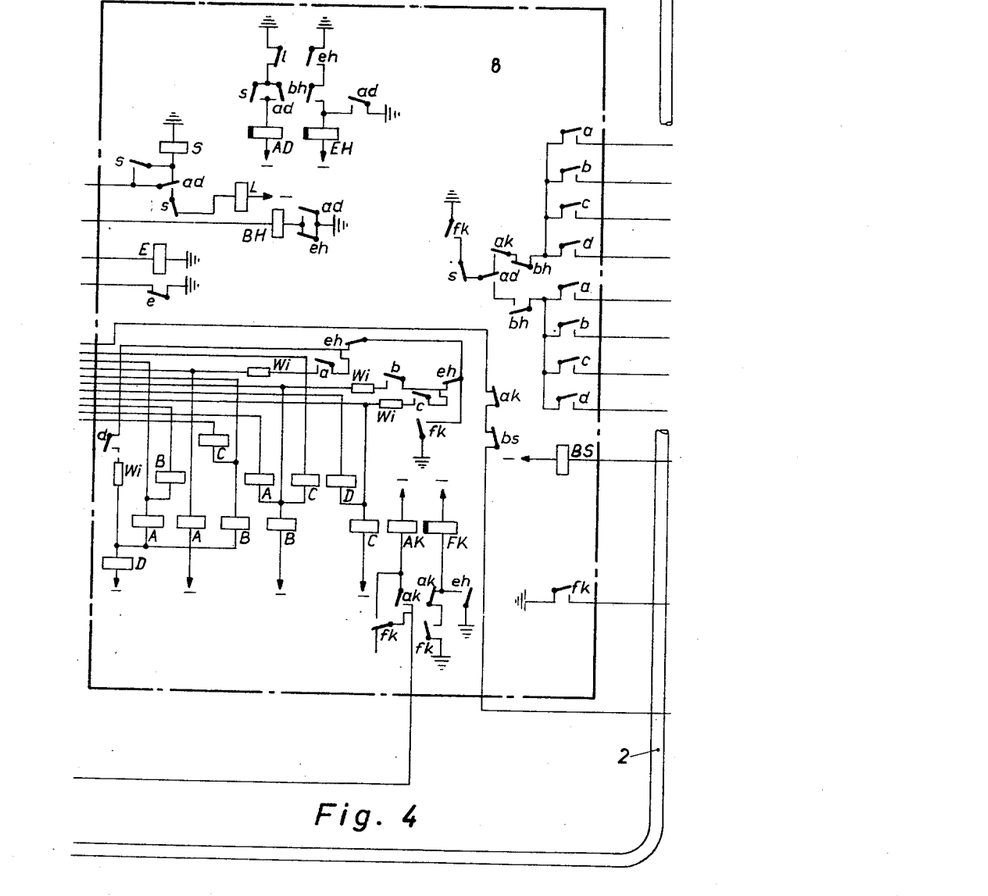

When dialing the second criterion digit, this is taken up by relay ZM2 because on conclusion of the first pulse series the relay C has been excited and has switched its contact $c$ from ZM1 to ZM2. On the assumption that the destination criterion consists of two digits, the dialing operation has thus been finished. On termination of the second pulse train, relay D will be excited and thereby the sending-line control equipment 8, Fig. 4, be engaged. Contact $d$ of D energized closes the circuit of relay E, viz:

Minus resistance W$i$, contact $d$, relay E, contact $e$ in sender register 15, contact $e$ in the sending-line control equipment 8, ground.

Over contact $e$ of the relay E in 15 the relay E in 8 is excited. Contact $e$ of the latter relay hence interrupts the seizure line. In this way a certain order of serving the sender registers is provided since in any case none but the engaged sender registers can test on the sending-line control equipment 8 and will then be served by it in succession. The order of succession is determined by the chain connection of the $e$ contacts of the sender registers 15. When a sender group is being served, any sender registers 15 engaged subsequently shall not be able to test on the sending-line control equipment 8 until the first group has been served, whereupon they will be connected to this equipment conjointly as a new group.

With the contacts $d$, $e$ switched the relay G is excited. Thereby the bank contacts for wiper $zm2$ are joined to the code relays A—D of equipment 8. The combination of these relays that corresponds to the criterion dialed by means of equipment 5 then responds. At the same time the magnet SM of the respective sender is excited in the circuit:

Minus SM, $nsi/nsr$ (dialing equipment 5), contact SK (sender 4), contacts $g$, $e$ (equipment 15), contact $ad$ (equipment 8), relay S, ground.

Figure 5:
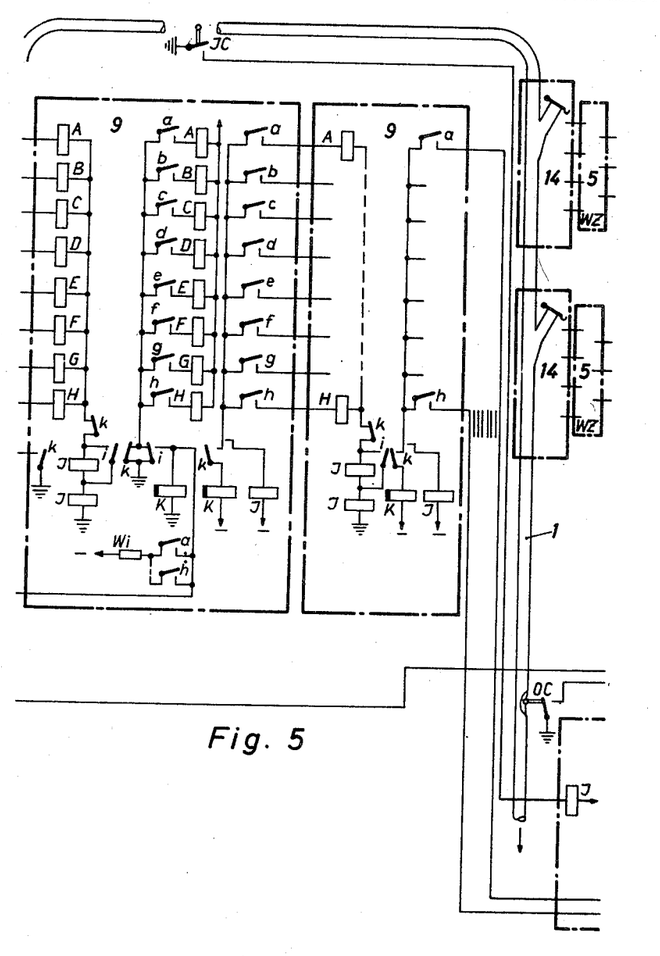
Figure 6:
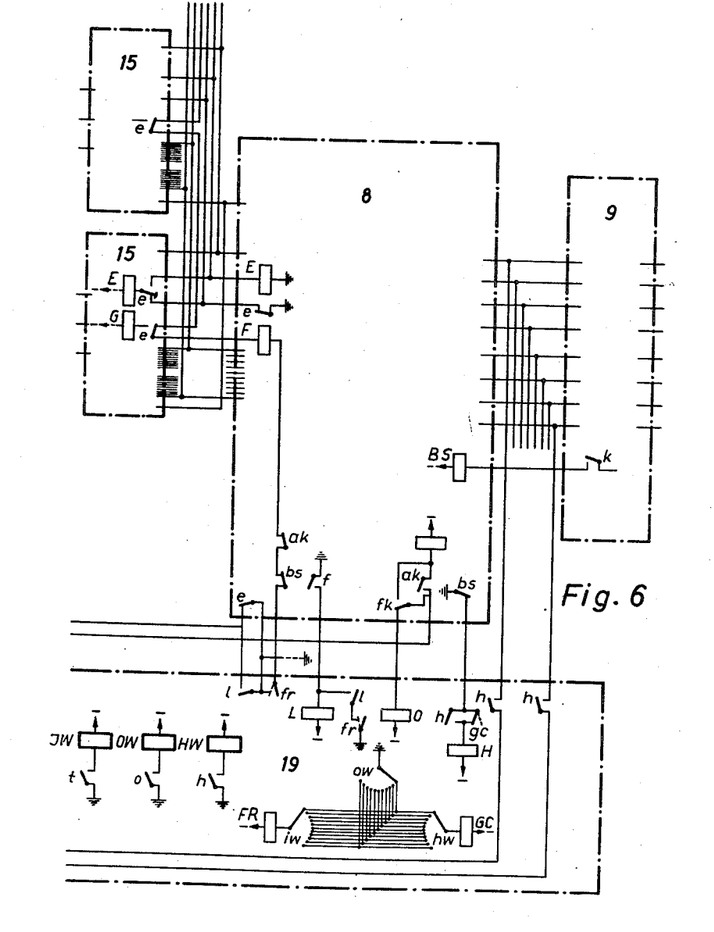
Figure 7:
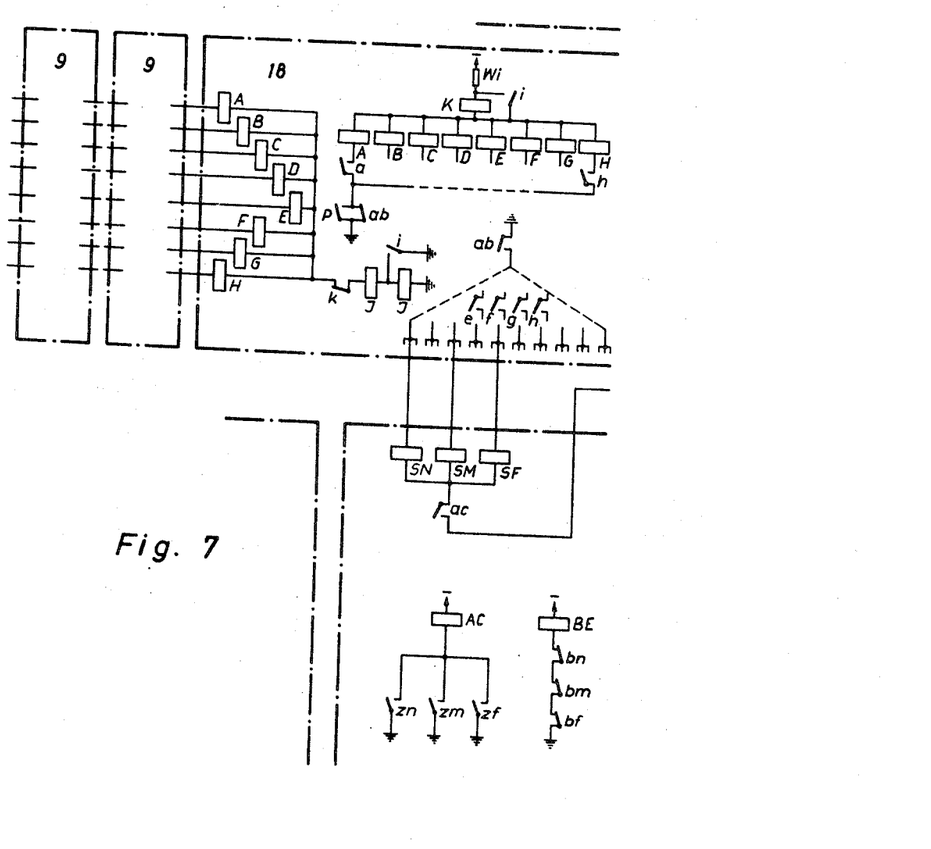
Figure 8:
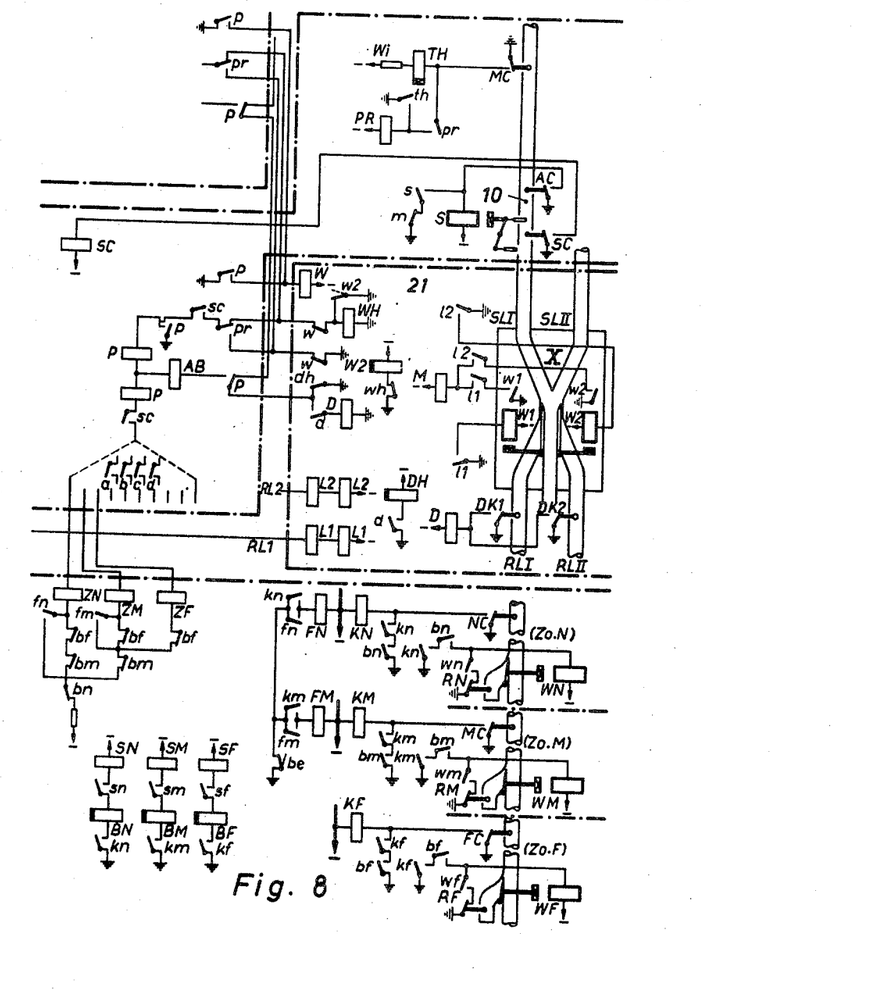

Relay AD in 8 is operated, contact $ad$ in the circuit of relay EH is closed, and this relay is excited too. Relay EH closes the contact $eh$ in the circuit of relay FK, which hence responds. The contacts $fk$ cause the contacts of the code relays A—D to be connected through to the respective relays A—H in the sending-line registers 9, Fig. 5. The magnet SM of sender 4 acts to unlock the socket leading into the tube line 2, so the carrier waiting in the socket will enter this line. When that unlocking takes place, contact SK returns to normal. Relay S in 8 hence falls off. Contact $s$ consequently reassumes its at-rest position and applies potential to the tens contacts of the code relays A—D, that is, the contacts leading to the first sending-line register 9. By contact $s$ in the circuit of the relay L in 8 this circuit is now broken. Thereby the circuit of relay AD is broken too. Accordingly the holding circuit:

Minus, relay B (equipment 15), contact $g$, contact $b$, relay BH (equipment 8), contact $ad$ or contact $eh$ ground, in which relay B in 15 has been energized, is likewise interrupted. This relay B and the relay BH in 8 therefore falls off and thus by means of contact $bh$ acts to switch, in the sending-line register 9, the units contacts of the code relays to the transfer leads by which the control equipment 8 is in circuit connection with the first register 9. In 8 the code relays corresponding to the respective units criterion now energize and remain energized owing to holding coils fitted to them.

Meanwhile the carrier has reached the end contact OC, Fig. 3 of the first section of the tube line 2. This contact is operated by the carrier and over contact $fk$ closes the circuit of relay AK in 8. By contact $ak$ hence closing the units criterion is transferred from the control equipment 8 to the first register 9. Another contact $ak$ breaks the circuit of relay FK and thus disconnects this register.

Relay J in 9 has already been excited, together with the code relays, when the tens criterion was transferred, because contact $k$ when at normal has been closed. On transfer of the units criterion, and after release of relay FK in 9, the relay K in the first register 9 can respond, having been shorted by contact $fk$. Relay K by means of its contact $k$ applies positive potential to the conductors leading to the second sending-line register 9. Through the excitation of the relays J, K the holding coils of the code relays A—H in the first register 9 becomes currentless, so the relays A—H fall off, whereby the relays J, K likewise deenergize. The second register 9 has now received the criterion and transfer it to the next following sending-line register in the same manner as the first register.

The arrangement here illustrated by way of example comprises two sending-line sections 2, 1, section 2 being more remote from the central and the receivers than section 1, but any number of such sections of registers may be provided.

When now a carrier passes from line section 2 into section 1, section 1 will be blocked in respect of its senders 14. Contact JC between the two sections 2, 1, is connected over relay J with a carrier counter 19 and thus applies a pulse to this relay. Contact $i$ of relay J transfers this pulse to a selector JW. In addition, selectors OW, HW are provided. The relays for controlling these are designated O, H, respectively. Relay H is operated by contact $bs$ of the sending-line control equipment 15 which is preconnected to the sending-line control equipment 8 connected over sender registers 15 to the senders 14 of line section 1. The selectors JW, OW, HW when at rest are on contacts corresponding to each other. Their wipers are designated $iw$, $ow$, $hw$, respectively. The relays FR, GC are on one side joined to the minus terminal of the voltage source while on the other side they are joined to the wipers $iw$, $hw$, respectively. Wiper $ow$ is grounded. Consequently, with the wipers in the positions shown the relays FR, GC are in their state of energization. Thus, when wiper $iw$ is moved one step, relay FR will thereby be caused to fall off. Its contact $fr$ hence breaks the start or release lead to line section 2. The carrier having traveled along this section arrives to switch a second contact OC, which belongs to the line section 1. Thereby a pulse is applied to relay O of counter 19 and is transferred by contact $o$ to selector OW. The wiper $ow$ hence moves one step onward, whereby the circuit of relay FR is reclosed whereas that of relay GC is broken. If the last sending-line register of line section 2 is not busy, relay H in 19 energizes. Its contacts $h$ close the connections from the sending-line register of line section 2 to the last register of line-section 1. The criterion will now be transferred from line section 2 to the first register 9 of line section 1. Such transfer is continued until the criterion arrives in the final register 18.

In order that the line section 2 may not be able, in consequence of too close a succession of the carriers in it, to block the line section 1, a regulating circuit is provided.

When the control equipment 8 of line section 1 is engaged, the relay E energizes. Its contact $e$ breaks the circuit of relay F. By contact $f$ of F the start or release lead of line section 2 is interrupted. Even if some carriers in leaving the line section 2 have entered the line section 1, section 2 will no longer be available for sending. As soon as the carrier counter 19 indicates that there are no carriers between the contacts JC and OC of line section 1, relay FR in 19 is reexcited and by means of its contact $fr$ applies positive potential to relay F. In order that, however, line section 2 may not be blocked unduly long by section 1 interrupting the start or release lead, relay L in 19 will be excited on starting the first carrier. By contact 1 of L the lead to section 2 is again switched through. Section 2 can now be put into action till the first carrier in leaving this line section enters section 1 and switches the contact JC to operate relay J, whose contact $i$ then actuates the selector JW to disconnect relay FR and thereby to break the start lead through opening the contact $fr$ of FR. This regulating circuit thus renders it possible for the senders to be used uniformly as regards both line sections.

When the criterion has arrived in the final register 18, and as soon as contact AC, situated a short distance before the central routing switch or exchange X, is switched by the arriving carrier, the separating relay S energizes over that contact and holds itself over its contact $s$. This relay governs the admission of the carrier into the chamber 10 which comprises a spacing device for the carriers. The carrier falls into chamber 10 and switches the contact SC. The central control equipment 21 is engaged in such a manner that the relay SC, operated by the said contact SC, closes its contact $sc$ and thus establishes the connection of the code organs with the control equipment 21. Relay WH is excited over contact $sc$, relay P, contact $sc'$ and contact $w$. Contact $wh$ of WH breaks the circuit of W2 with a great delay. By contact $w2$ the relay WH is shorted, so the current over $w$, $sc'$, P, P, $sc$ is amplified to energize the relay P. Contact $p$ in the circuit of relay W hence closes, so that the break contacts $w$ fall off.

Just as in the case of the sender registers, a group formation is effected in the case of the final register 18. After W has been excited, registers 18 engaged will no longer be able to affect the central control equipment 21. When several final registers have been tested on simultaneously, they will be served, by the chain connection of the contacts $p$ of each final register, in the order of succession in which they have been actuated.

Relay AB in 18 energizes on excitation of relay P, as contact $p$ in the circuit of AB becomes switched over. Accordingly contact $ab$ controls the relay (such as SM) belonging to the zone of the desired receiver. With two-digit criteria 10 zones, divided among several lines, may be provided. Relay ZM by means of its contact $zm$ inserts the relay AC. This relay in its turn switches the coils of the zone-register relays SN, SM, SF to the contacts of the code relays E—H. Each reeciver has one zone-register relay assigned to it. For each zone 10 zone-register relays or less may be provided. In the case represented by way of example, merely one receiver is provided for each zone. Relay SM responds whenever the combination of the code relays E—H is such that the receiver of the middle zone shall be the aim of the initiated control operations. Relay SM holds itself over a second coil and its holding contact, and thus also causes the zone-busy relay BM to pull up. This relay at once blocks the circuits of all the zone relays. At this moment the carrier is standing in the chamber 10. Connected in series with relay SM is relay L2 of equipment 21. L2 is allocated to the desired receiving line and by means of its contact 12 operates the switch magnet W2 of the central routing switch X. The switch is set so as to operate the contact $w2$, included in the circuit of relay M which by means of its contact $m$ breaks the holding circuit of the spacing magnet S. Thereby the blocking or spacing device at 10 is restored to normal, that is, to the position shown, whereby the carrier is admitted to switch X. Here the carrier comes to operate the contact DK2 in order to excite the relay D. This relay by means of its contact $d$ inserts the relay DH which after the carrier has left the switch X falls off with a great delay. During the releasing time of relay DH the lead to relay AB in 18 is broken and the contacts $a$, $b$ release the final register 18 and the central control equipment 21.

The carrier has now entered the respective receiving line and operates the contact NC of the near zone. Consequently relay KN is excited and its contact $kn$ closes the circuit of relay FN that holds itself over its contact $fn$ and over break contact $be$. On seizure of the receiving line, relay BE has deenergized by contact $bm$ becoming opened. Relay FN by means of its contact $fn$ bridges the contact $bm$ in the circuit of relay $Zn$, so that waiting carriers intended for the near zone of the engaged line can be started.

The carrier then passes by contact MC of the mid-zone. Relay KM is thereby excited and completes the circuit of the routing switch at WM. This switch is so set as to close its holding circuit by means of contact wm.

Through breaking its contact km the relay KM has caused the zone-register relay SM and the busy-relay BM to fall off. Through the release of BM the circuits of the relays ZM and ZF will be closed. Thereby the conditions for starting the carriers have been reestablished in respect of all the zones. The routing switches at WN, WM, WF of the receiving line are restored to normal through the carrier passing by the contacts RN, RM, RF, respectively, each of these interrupting the holding circuit of the respective routing switch.

If the carriers follow too closely upon each other, they can happen to store up before the spacing device at 10. A pile so formed will be under control of the magazine contact MC. Each sending line is provided with such a device. Whenever contact MC is closed by carriers collecting, then the respective sending line shall have the preference. In fact, contact MC then causes the thermo relay TH to respond, and this by means of its contact th inserts the relay PR. Relay PR has a contact pr in the circuit of relay P in the final register 18. By this contact the relay WH will be disconnected. Thus, when the central control equipment becomes idle, the relay P of the respective final register 18 will test on it much quicker than the registers at the lead extending to relay WH, as these final registers cannot cause response of their associated relay P until relay W2 in the central control equipment 21 has released. Meanwhile, however, the relay P of the directly connected final register 18 has already excited the relay W in the central control equipment 21 and has thereby accomplished the complete interruption of the test line. The preference which the over-loaded sending line is thus given is maintained so long as contact MC is kept closed, and till relay PR has deenergized.

While I have described above the principles of my invention in connection with specific apparatus, it is to be clearly understood that this description is made only by way of example and not as a limitation to the scope of my invention.

What is claimed is:

1. A dispatch tube system comprising a tube line, a plurality of carrier senders for said tube line arranged in at least two groups each group being allocated to a predetermined section of said tube line, a destination code sending device for each carrier sender, a registering device for storing destination codes for each carrier sender, a plurality of code storing devices for each group of carrier senders, means for transferring the destination codes successively from one code storage device to the next succeeding one as soon as it becomes free and means under the control of said storage devices for controlling the release of the carriers from said carrier senders.

2. A system as claimed in claim 1, wherein said registering devices comprise stepping switches responsive to the actuation of said destination code sending devices and a sending line control device associated in common with the plurality of registering devices of a tube section initiates the transfer of said code designations from said registering devices to said code storing devices.

3. A system as claimed in claim 2, further comprising a pilot device for counting the number of carriers which have entered said sections and have left them, means for comparing said numbers and means responsive to said last-mentioned means for controlling the passage of the carriers through the sections.

4. A system as claimed in claim 3, wherein said pilot device is located between the said groups of code storing devices and comprises means for preventing carriers from the carrier senders of one said section from entering the transmission tube if such section is being traversed by carriers from another section and/or if the destination codes of said first-mentioned carriers have not been transferred to a code storage device following said pilot device.

5. A system as claimed in claim 2, wherein contact means is located at the commencement and end of each said section and comprising means responsive to the actuation of said contact means for controlling the operation of said pilot device.

6. A system according to claim 1, further comprising a central routing tube switching means to which said tube line extends, outgoing tube lines provided with receivers and also terminating in said central switching means, an end register, means for transferring destination codes from said code storage devices to said end register and means under the control of said end register for actuating said switching means.

7. A system according to claim 6, further comprising a plurality of incoming tube lines, carrier arresting devices associated with said incoming tube lines at a point immediately in front of said central switching means, means responsive to the free condition of said outgoing tube lines for actuating said arresting devices, and a preference circuit for actuating the arresting devices in such order that when the carriers retained in a line by its arresting device exceed a predetermined number preference is given to that line until the number of arrested carriers is reduced to a predetermined extent.

8. A dispatch tube system comprising a central routing tube switching means, a plurality of carrier senders associated with a tube line incoming to said switching means, a tube line outgoing from said switching means having a plurality of carrier receivers associated with it along its length and divided into a plurality of zones, the lengths of which are related to their distances from the point of release of the carriers, destination code storage devices for each said zone, control devices for each zone and means responsive to said control devices for clearing said outgoing tube line in accordance with the zone of the destination code indicated for a carrier awaiting release at said point of release.

9. A system as claimed in claim 8, wherein a plurality of receivers are located in each said zone along said outgoing tube line.

10. A system as claimed in claim 9, wherein means is provided at said point of release for controlling the release of a carrier in dependence both upon its destination and the destination of the carriers already in the outgoing tube line.

References Cited in the file of this patent
UNITED STATES PATENTS

| | | |
|---|---|---|
| 1,838,208 | Appelius | Dec. 29, 1931 |
| 2,085,265 | Mauch et al. | June 29, 1937 |

FOREIGN PATENTS

| | | |
|---|---|---|
| 503,729 | Great Britain | Apr. 13, 1939 |